Figure 1:
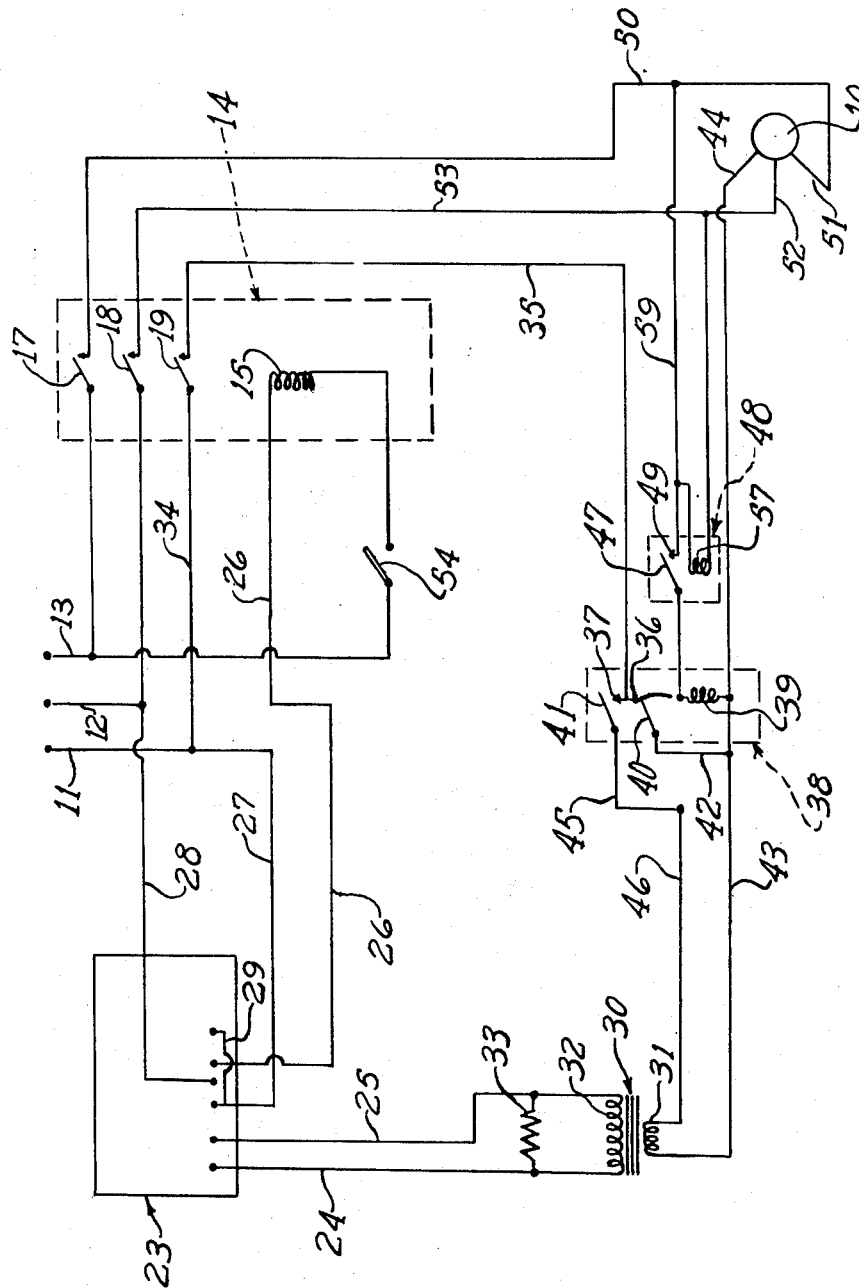

Sept. 7, 1954        T. T. STACK        2,688,720
ELECTRONIC OVERLOAD CONTROL FOR MOTORS
Filed Nov. 1, 1949        2 Sheets-Sheet 1

INVENTOR.
Theodore T. Stack
BY
Charles F. Vojtech
atty

Patented Sept. 7, 1954

2,688,720

UNITED STATES PATENT OFFICE 2,688,720

ELECTRONIC OVERLOAD CONTROL FOR MOTORS

Theodore T. Stack, Chicago, Ill., assignor to Crane Packing Company, Chicago, Ill., a corporation of Illinois Application November 1, 1949, Serial No. 124,864

2 Claims. (Cl. 318—447)

This invention relates to automatic control mechanism for motors, either electric or electrically controlled and particularly to an apparatus for shutting off the motor at a predetermined load condition thereof.

Controls have been devised for furnaces or the like wherein an indicating device is utilized to show the temperature within the furnace, with control means capable of being set to a particular temperature to shut off the heating element of the furnace when the indicating device reaches the control point. Thus the temperature in the furnace may be represented by the position of the needle of a milliammeter, and the needle may be utilized to change the characteristics of an electrical device mounted on the control means and interposed in the needle's path of movement. By making the position of the electrical device adjustable along the path of the needle, the temperature of the furnace may be controlled by causing the electrical device to shut off the heating element of the furnace at the control point, thus maintaining a constant temperature within the furnace.

There are several such furnace controls available commercially. These controls in general utilize a electronic tube of the gas-filled type which may be set to become conducting under predetermined input conditions, thereby completing a circuit through a relay which in turn may control the current through a heating element. The input of the gas-filled tube is in turn connected to an electrical device which cooperates with the needle of a milliammeter to alter the input to the gas-filled tube when the pointer of the milliammeter reaches a predetermined position on its dial.

There are many motor-driven machine tools in industry which may become overloaded through inadvertence or negligence and thereby damage either the motor itself or some associated part of the machine tool. Thus, in the pump packing industry, certain forms of packing are produced by extruding plastic substance through a die and then further processing the plastic substance to form a completed packing. Occasionally, foreign matter will become mixed with the plastic material and will be unable to pass through the die because of the obstruction formed by the foreign matter. This imposes a severe load on the piston of the extruder which in turn is transmitted through the driving mechanism for the piston to the primary source of power. If the primary source of power is not immediately shut off, the intermediate mechanism may become seriously damaged, and where large extruders are used, the cost of repairing or replacing the damaged parts may be considerable in addition to the loss of production.

Various overload controls have been devised for motors, some relying on a thermal element such as the ordinary fuse to interrupt a circuit and others relying on an electromagnetic means which opens a switch when the current to the said electromagnetic means reaches a predetermined value. These devices, however, are not always satisfactory since the cutoff point cannot be accurately predetermined. Furthermore, there is a tendency for electromagnetic devices to chatter instead of cutting off cleanly. The furnace controls mentioned above, however, have sharp cutoff points and hence are well adapted for use as overload motor controls.

The principal object of this invention is to provide an overload control for a machine tool motor wherein the principal parts of the control are readily available as substantially standard units and wherein a sharp cutoff point is produced.

It has been found that where a current through a motor is utilized to control the point at which the motor is shut off, the control apparatus is very likely to be tripped to cut off the motor when the motor is first turned on, since, at starting, a current surge is created which may be greater than the overload current at which the motor is to be turned off. Under such conditions, the motor would never really start operating and might simply oscillate between an on and off position indefinitely.

Another object of this invention, therefore, is to provide an overload control for an electric motor or the like wherein means are provided for automatically disconnecting the control from the motor while the initial surge is passing through the motor.

A still further object of this invention is to provide a rugged overload control for a motor or the like which is relatively simple and inexpensive and which may be readily applied to any motor, electric or electrically controlled whether large or small.

Figure 2:
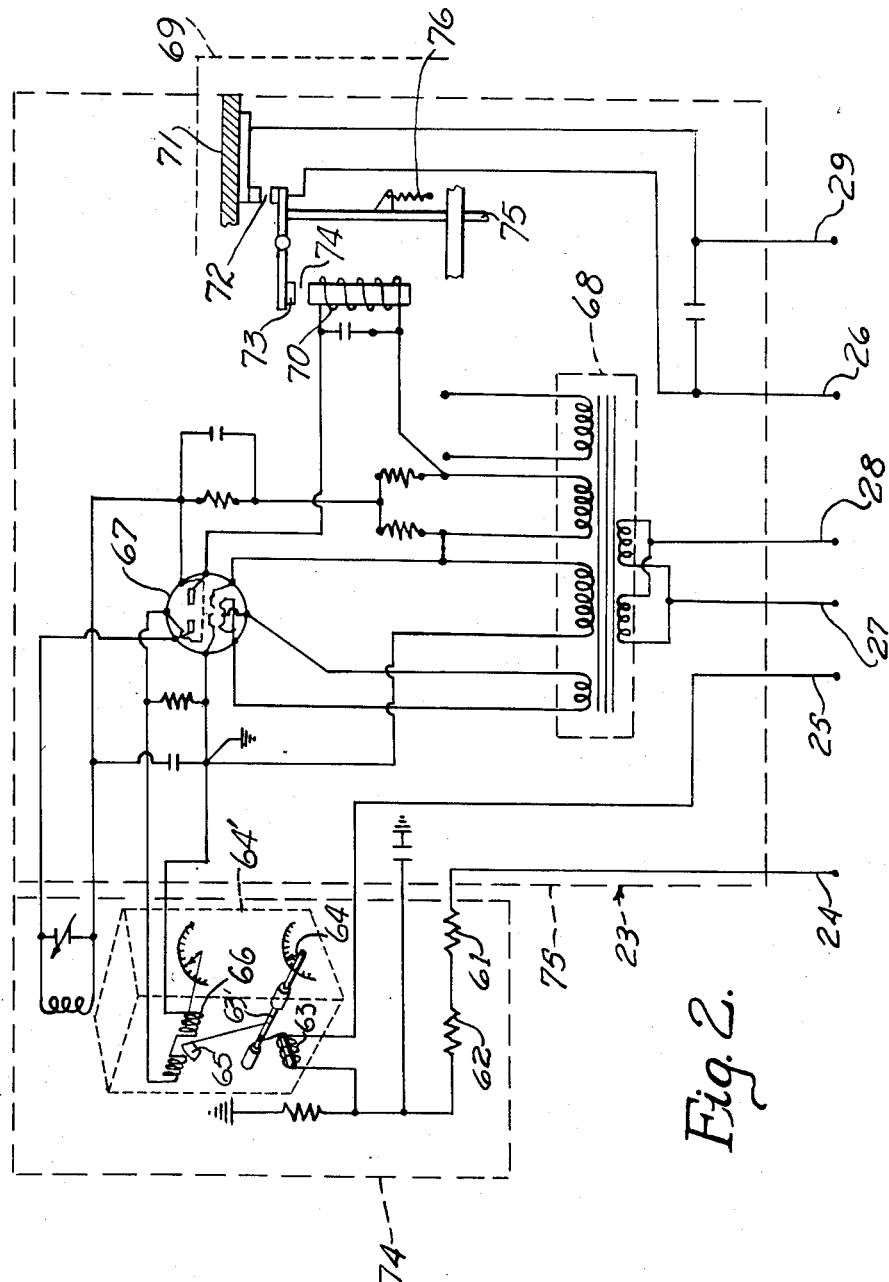

These and other objects and features of this invention will become apparent from the following detailed description when taken together with the accompanying drawings, in which Fig. 1 is a schematic wiring diagram of the connections between a standard readily available temperature control and a motor to be controlled thereby, the circuit including means for preventing the connection of the control to the motor circuit until after the initial surge to the motor has passed; and Fig. 2 is a wiring diagram of a readily available temperature control for furnaces or the like.

Referring now to Fig. 1 for a more detailed description of the invention, there is shown in the lower right-hand corner thereof a motor 10 of the three-phase, alternating current type which may be the motor of a machine tool of any size or description. The motor 10 receives its energy from a three-wire three phase source having conductors 11, 12 and 13, respectively. The application of the electrical energy in the conductors 11, 12 and 13 is controlled by a relay 14 having an energizing coil 15, the energizing of which effects closing of switches 17, 18 and 19.

The control means for the motor is shown schematically in Fig. 1 as a rectangle 23. This control means may be in the form of an adaptation of a standard furnace control mechanism of the type briefly outlined above, the control means being provided with a pair of conductors 24 and 25 which serve to impress upon control 23 a current which varies in accordance with the current flowing through motor 10. The power input to the control 23 is comprised of two conductors 27 and 28 connected respectively to conductors 11 and 12. The current from conductor 27 passes through a conductor 29 to the control and then out through conductor 26 to the coil 15. Motor 10 is coupled to the circuit including conductors 24, 25 through a transformer 30 having a primary winding 31 and a secondary winding 32. A shunt 33 is connected across the terminals of secondary winding 32 so as to reduce the current passing through conductors 24 and 25 to a value which will normally keep the indicating device of the control in its mid-position and thereby enable the indicating device to follow with full scale the variations of the current in motor 10.

It will be observed that the energy from conductor 11 passes to a conductor 34 and then through switch 19 and a conductor 35 to the contacts 36 and 37 of a relay 38. Said relay 38 is provided with an energizing coil 39 and a pair of switches 40 and 41, switch 40 being adapted to close the circuit through contact 36 when relay coil 39 is deenergized, and switch 41 being adapted to close the circuit through contact 37 when relay coil 39 is energized. Switch 40 is connected through a conductor 42 to a conductor 43 which at one end is connected to the primary coil 31 of transformer 30 and at the other end is connected to one of the leads 44 of motor 10. Switch 41 is connected through a conductor 45 to a conductor 46 which is connected at one end to the other side of primary coil 31 of transformer 30 and at its other end to a switch 47 of a relay 48. Said switch 47 has a contact 49 which is connected through line 50 to a second lead 51 to motor 10. Line 50 is connected at its opposite end to the contact of switch 17 and thence to conductor 13 of the input three-wire line. The third lead 52 of motor 10 is connected through a conductor 53 to the contact of switch 18 and thence to conductor 12 of the three-wire line.

It will be apparent that the motor 10 will be operated whenever the relay 14 is energized. To control the energization of the relay 14, a manually operable switch 54 is provided. This switch is arranged in series with the coil 15 in a circuit extending from the conductor 13 through switch 54, coil 15, conductor 26, control device 23 and conductors 27 and 11. Thus when switch 54 is closed by the operator, the circuit is completed through the energizing coil 15 of relay 14 which immediately closes switches 17, 18 and 19 to energize the motor 10. It is to be noted at this point that opening of the switch 54 at any time will open the circuit through the coil 15 and de-energize the relay 14 and consequently the motor 10.

The closing of switches 17, 18 energizes the winding 57 of relay 48 through conductors 59 and 60 connected respectively to lines 50 and 53. Said relay 48 is a slow-acting or retarded relay and is adjusted to remain inoperative for a period which is longer than the duration of the initial current surge through motor 10. This means that the circuit through the primary coil 31 of transformer 30 is open as long as the surge is passing through the motor and therefore no corresponding current is impressed upon the control 23. In this manner the control 23 is rendered ineffective until the initial motor surge has passed.

It will be observed that the current to lead 44 of motor 10 passes through switch 40 and contact 36 of relay 38, thereby cutting out primary 31. In order to render primary 31 effective, it must be connected to lead 35 through conductor 46 so that the primary 31 will then be in series with lead 44 and motor 10 and thus give a true indication of the current passing through motor 10. If the current through switch 40 were interrupted in the transferring of conductor 35 from conductor 43 to conductor 46, the motor would in effect be again shut off and started which would create another initial surge which would be transferred through transformer 30 to control 33 and cause the control to stop motor 10. To avoid this difficulty, switches 40 and 41 of relay 39 are so arranged that there is an overlap in the actuation of the two switches. Accordingly the switch 40 is slow to open and will remain closed until the switch 41 has become effectively closed. By such an arrangement, no current interruption of the motor circuit will be encountered.

Referring now to Fig. 2, the control 23 is of standard design and is comprised of two principal parts, one, 74, constituting the meter, and the other, 75, constituting the circuit controlled by the meter. The connections to the control part 75 correspond to those shown in Fig. 1 and comprise input conductors 24, 25 from transformer 30, the power connections 27 and 28 and the connections 26 and 29. The input connections 24 and 25 pass respectively through series resistances 61 and 62 and through the winding 63 of the meter armature 63'. The armature 63' is operatively connected to a pointer 64 associated with the meter dial face 64' and is also connected to a metallic flag 65 which is adapted to pass between a pair of coils 66, the inductance of which is adapted to be changed by the passage of the flag 65 therebetween. The coils 66 are connected in series and are connected to the input of a gas-filled electronic tube 67 which is normally conducting until the inductance through coil 66 is altered by the interposition of flag 65 therebetween. Said tube 67 conducts current from a transformer 68 connected to power leads 27 and 28 to a relay 69 having associated therewith a coil 70 and a pair of normally open combined throw-out and manually operable reset contacts 72 controlled thereby. The normally open contacts 72 are adapted to become closed when the armature 73 of the coil 70 is attracted. The armature 73 however is normally maintained out of the sphere of magnetic influence of the coil 70 as evidenced by the relatively large air gap indicated at 74. A manually operable reset plunger 75, which is spring-pressed at 76, is adapted, upon initial energization thereof, to bring the armature within the magnetic influence of the coil 70 so that the latter, when energized, will attract the armature and thus cause closure of the contacts 72.

Thus, when flag 65 is not located between coils 66, relay 69 is energized and closes the contact 72 and completes the circuit from conductor 29 to conductor 26. Inasmuch as conductor 29 is connected through conductor 27 to the input power lead 11, the closing of contacts 72 will permit coil 15 to be energized and remain so as long as the manual switch 54 remains closed. Should tube 67 cease to become conducting as by the passage of flag 65 between the coils 66, relay 69 will then become deenergized and open contacts 72, thereby deenergizing coil 15 and opening switches 17, 18 and 19 which control the energization of motor 10.

Flag 65 will of course move with pointer 64 about the axis of armature 63 and will take a position corresponding to the current passing through motor 10. If the motor is to be shut off when a predetermined current value has been obtained, coils 66 must be movable over the arc described by flag 65. This is accomplished in the standard meter arrangement by mounting the coils 66 on a similarly pivoted pointer with external means for adjusting the position of the coils relative to the path of the flag 65. For shutting off motor 10 at a low current value, coils 66 are placed near the zero setting of the armature 63 and similarly for a higher current value through motor 10, coils 66 are moved to a point further removed from the zero point of the meter.

In the operation of the device, closure of the start switch 54 on the part of the operator will establish a current leading from the source through conductor 13, start switch 54, coil 15, conductor 26, contact 72, and conductors 29, 27 and 11. Energization of the coil 15 will close contacts 17, 18 and 19 and energize the motor 10.

In the event of an overload on the motor 10 resulting in movement of the flag 65 to a position wherein it becomes inductively coupled with the coil 66 at the particular setting thereof, the tube 67 will cease to pass current and the coil 70 will become de-energized, allowing the contact 72 to open and discontinue the previously described circuit through the coil 15. De-energization of the coil 70 and opening of the contact 72 will permit the armature 73 to move out of the magnetic sphere of influence of the coil so that even though the operator may maintain the switch 54 closed, the circuit through the coil 15 will not become effective to again start the motor until such time as the reset plunger 75 is operated. Thus any serious damage to the motor itself or to an associated apparatus is effectively prevented.

It is quite apparent that the control hereinabove described may be used on devices other than the extruder mentioned in the fore part of this specification. Thus the control may be used to stop some manufacturing process such as the rolling of tube ends into a tube sheet of a condenser when a predetermined degree of rolling has been obtained. It may thus be used to accomplish the purpose of controls such as that disclosed in Dudley Patent No. 2,431,316. Other uses will suggest themselves to those skilled in the art. It is understood, therefore, that the scope of this invention is not to be limited to the foregoing description, but is to be determined by the appended claims.

What is claimed is:

1. In an overload control for an electric motor, the combination with means including a normally open relay contact for energizing said motor from a suitable supply source, a coil operable when energized to close said contact, and means including a second normally open relay contact and a start switch for energizing said coil, a second coil operable when energized to maintain said second relay contact closed, an electronic tube having its output circuit connected to said latter coil and having an input circuit, said tube being adapted to conduct current upon application to said input circuit of a predetermined voltage, of an inductance coil disposed in said input circuit, a meter electrically connected to the motor and having a pointer the position of which is a function of the current flowing through the motor, a metallic flag mounted on said movable pointer and adapted when a predetermined maximum meter reading has been attained to become electrically coupled to said inductance coil to decrease inductive reactance so as to render said electronic tube nonconductive.

2. In an overload control for an electric motor, a main circuit for the motor including a normally open relay contact for energizing said motor from a suitable supply source, a coil operable when energized to close said contact, and means including a second normally open relay contact for energizing said coil, a second coil operable when energized to maintain said second relay contact closed, an electronic tube having its output circuit connected to said latter coil and having an input circuit, said tube being adapted to conduct current upon application to said input circuit of a predetermined voltage, an inductance coil disposed in said input circuit, a meter including current sensing means inductively coupled to said motor circuit, a pointer responsive to said sensing means, a metallic flag mounted on said pointer and adapted when a predetermined maximum meter reading has been obtained to become electrically coupled to said meter coil to alter the inductive reactance of the latter so as to render said electronic tube nonconductive, a branch current path for the motor arranged to shunt said current sensing means, a normally open relay contact in said main motor circuit, a normally closed relay contact in said branch current path, a coil operable when energized to first close the contacts in said main circuit and to thereafter open the contacts in said branch current path, and relay means operable after a predetermined operation of the motor for energizing said last mentioned coil.

References Cited in the file of this patent

UNITED STATES PATENTS

| Number | Name | Date |
| --- | --- | --- |
| 697,016 | Read | Apr. 8, 1902 |
| 931,994 | Cheney | Aug. 24, 1909 |
| 1,732,038 | Connell et al. | Oct. 15, 1929 |
| 2,203,920 | O'Hagen | June 11, 1940 |
| 2,521,479 | Rautter | Sept. 5, 1950 |
| 2,535,782 | Carlson | Dec. 26, 1950 |
| 2,539,123 | Dudley | Jan. 23, 1951 |